C. A. WARD.
BATTERY VENTILATING MEANS FOR ELECTRIC VEHICLES.
APPLICATION FILED JUNE 3, 1920.
1,377,235.
Patented May 10, 1921.
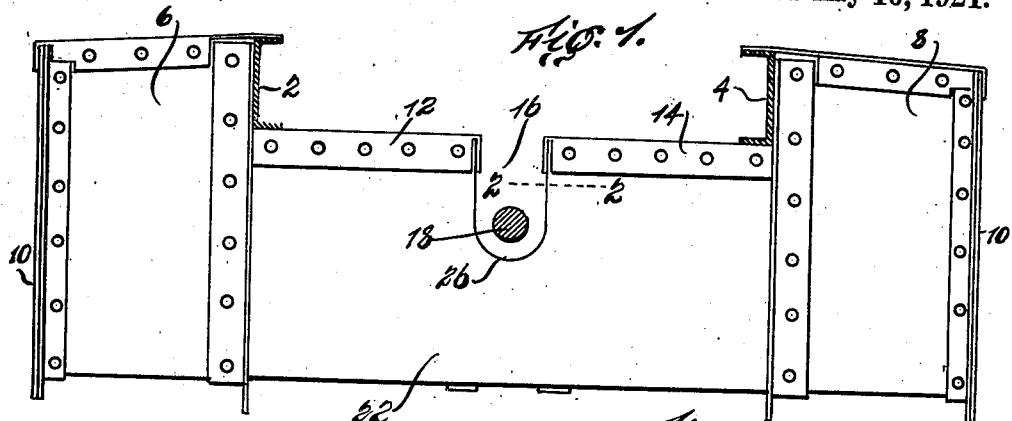
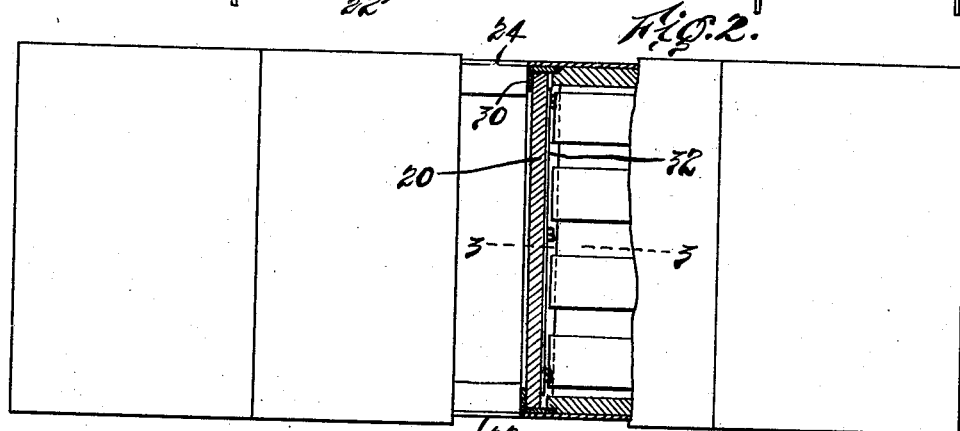
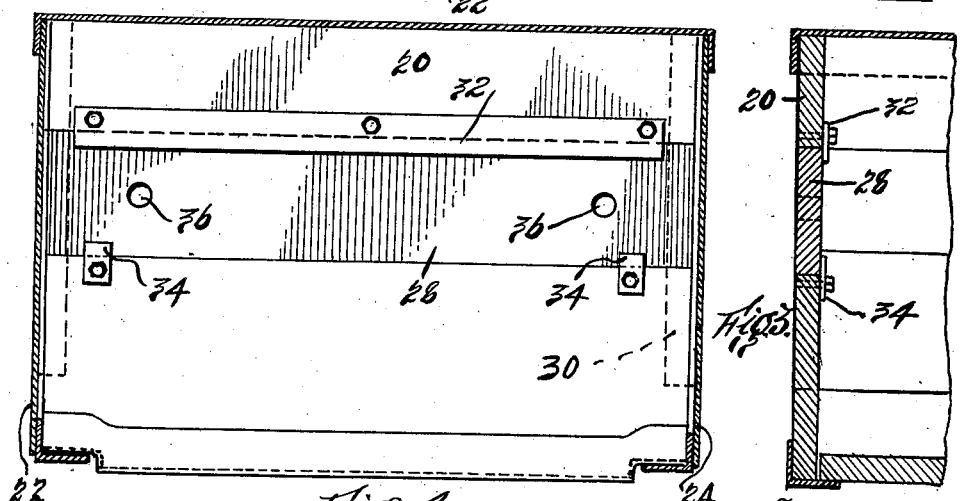
Inventor
Charles A. Ward
By his Attorney

UNITED STATES PATENT OFFICE.

CHARLES A. WARD, OF MOUNT VERNON, NEW YORK.

BATTERY-VENTILATING MEANS FOR ELECTRIC VEHICLES.

1,377,235.   Specification of Letters Patent.   Patented May 10, 1921.

Application filed June 3, 1920. Serial No. 386,265.

*To all whom it may concern:*

Be it known that I, CHARLES A. WARD, a citizen of the United States, residing at Mount Vernon, New York, have invented certain new and useful Improvements in Battery-Ventilating Means for Electric Vehicles, of which the following is a clear, full and exact description.

This invention relates to electric vehicles, and particularly to ventilation of the battery compartments of such vehicles, and a general object of the invention is to provide for such ventilation without undue exposure of the battery to dust and foreign matter or to tampering by mischievous or malicious persons.

The invention aims particularly to provide for substantial ventilation of the battery compartments in that type of electric vehicle in which the driving shaft extends between the two halves of a centrally divided battery cradle having battery inclosing walls upon each side of the shaft, an important feature of the invention being the utilization of the movement of the shaft to obtain the ventilating circulation of the air and battery gases through the battery compartments.

Other objects and important features of the invention will appear from the following desription and claims when considered in connection with the accompanying drawings, in which—

Figure 1 is an end elevation of the battery cradle of the type and general construction of that shown in my copending application, Serial No. 352,037, filed Januray 17, 1920, the motor shaft shown in section in this figure passing between the two battery compartments of the battery cradle in the manner disclosed in my Letters Patent No. 1,309,164, granted July 8, 1919; Fig. 2 is a plan view with one of the compartments shown in section substantially on the line 2—2 of Fig. 1; Fig. 3 is a vertical transverse section on the line 3—3 of Fig. 2 and Fig. 4 is a vertical longitudinal section looking toward the removable wall section from the inside of the battery compartment.

In the drawing, the chassis side frame channel bars 2 and 4 are shown as supporting the battery cradle in the manner more fully illustrated and described in my copending application above identified, the battery cradle comprising the large battery compartments 6 and 8 arranged outside the main chassis frame and of such height that when the outer doors 10 are opened the operator may conveniently reach over the batteries in these compartments to replenish the water in the batteries in the smaller compartments 12 and 14. The smaller compartments, as shown in Figs. 2, 3, and 4, are separated from the central space 16, in which the driving shaft 18 of the vehicle is located, by walls 20 bounding this space upon the two sides of the shaft. Common end plates 22 and 24 serve, as more fully set forth in said copending application, to truss the battery cradle, these plates being cut down, as shown at 26, to provide for the passage of the shaft 18.

In order to provide for ventilation of the batteries in the compartments, particularly in the inner compartments 12 and 14, panels 28 are provided in each of the walls in proximity to shaft 18. These panels, as shown, are confined between vertical angles 30 at their ends, an upper strip 32 projecting over the channel opening, and locking members 34 carried upon bolts extending through the walls 20 and upon which said members 34 may be rotated into panel releasing position. Finger openings 36 are provided in each panel so that when released the operator may swing the panel inward far enough to remove it from its opening and thus permit circulation of air through the opening to carry away the battery gases and cause them to be replaced by pure air.

It will be noted that the location of the panel receiving openings adjacent to the driving shaft 18, which is a high speed shaft, provides for a positive circulation of the air through the battery compartment by the centrifugal action produced by the rapid rotation of the shaft. This is an important feature of the invention.

It will be understood that the invention is not restricted to the specific details of construction hereinabove described and which are shown in the drawings.

Having thus described my invention, what I desire to claim and secure by Letters Patent is—

1. In an electric vehicle having a driving shaft extending from near the front end of said vehicle to the rear axle, a battery cradle centrally divided to provide for the passage of the driving shaft between the two halves thereof, said cradle having battery inclosing walls upon each side of said shaft, and said walls being each provided in proximity to said shaft with a movable portion to provide ventilation for said batteries.

2. In an electric vehicle having a driving shaft extending from near the front end of said vehicle to the rear axle, a battery cradle centrally divided to provide for the passage of the driving shaft between the two halves thereof, said cradle having battery inclosing walls upon each side of said shaft, movable portions of said walls being arranged to provide openings extending along said shaft for the ventilation of said batteries.

3. In an electric vehicle, the combination with a vehicle chassis including a rear driving axle and a driving shaft extending from near the front end of said vehicle to said axle, of a battery cradle centrally divided to provide for the passage of said shaft between the two halves thereof and having battery inclosing walls upon either side of said shaft, of means for providing at will ventilating openings in the respective side walls in such relation to said shaft that a circulation of air over the batteries is induced by the shaft motion.

4. In an electric vehicle having a driving shaft extending from near the front end of said vehicle to the rear axle, a battery cradle centrally divided to provide for the passage of the driving shaft between the two halves thereof, said cradle having battery inclosing walls upon each side of said shaft, and having in said walls normally closed ventilating openings extending along said shaft upon opposite sides thereof, the wall closing means comprising panels extending throughout the length of the battery cradle and removably held within said openings.

Signed at Mount Vernon, N. Y., this 1st day of June, 1920.

CHARLES A. WARD.